Dec. 19, 1933. D. S. GARDNER ET AL 1,939,688
SURGICAL KNIFE
Filed Aug. 11, 1932
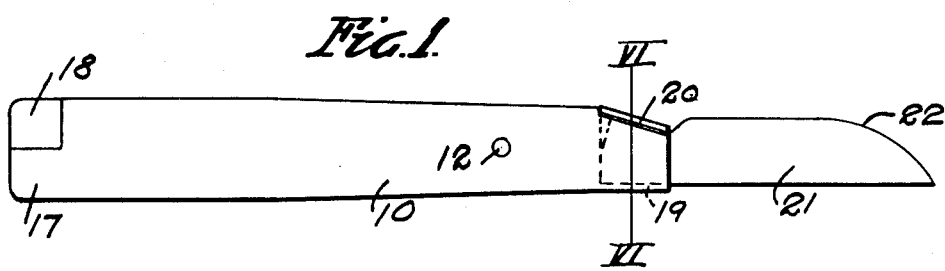
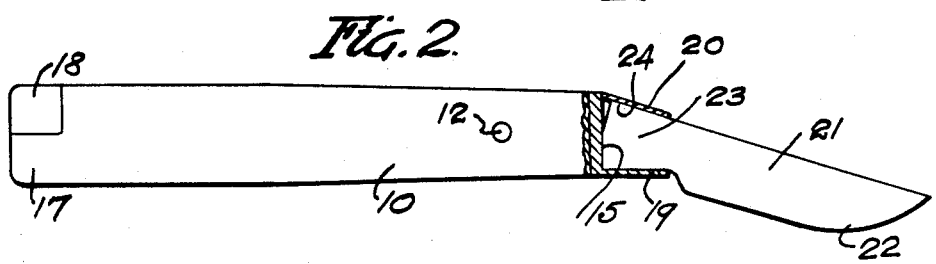
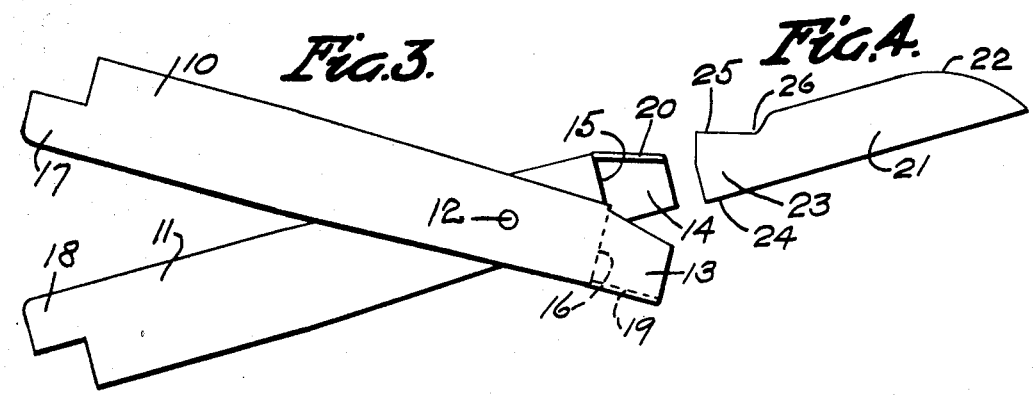
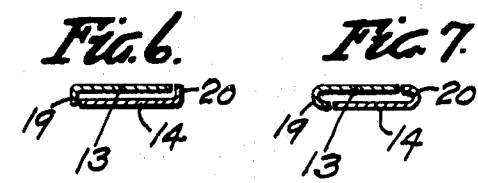
INVENTORS
David S. Gardner
Joseph A. Gardner
by J. H. Weatherford
atty Patented Dec. 19, 1933

1,939,688

UNITED STATES PATENT OFFICE 1,939,688

SURGICAL KNIFE

David S. Gardner, and Joseph A. Gardner, Memphis, Tenn., assignors of one-sixth to Royal Van Brocklin and one-sixth to Steven A. Van Brocklin, both of Memphis, Tenn.

Application August 11, 1932. Serial No. 628,340

8 Claims. (Cl. 30—9)

This invention relates to improvements in knives which comprise a holder and interchangeable blades therefor and particularly to such knives for surgical use.

The present invention is a continuation in part and improvement on our pending application for patent on Knives, Serial No. 579,496.

In surgical operations as therein set out, it is of extreme importance that very sharp knives be used, that the blades should be shaped, so far as their cutting edges are concerned, for the particular operation for which they are to be used, and that they should be thoroughly sterilized before using. It is also of importance in many operations that the alignment of the blades with respect to the handle be changed, often during the operation itself, in order that cutting may be done around and under parts.

The former of these conditions are most effectively met by the use of individual blades in connection with the handles, the blades being rigidly held in the handles yet readily removable therefrom; and the latter condition is met by establishing angularity of the clamping jaws with respect to the remaining portion of the handle and a complementary angularity of the shank portion of the blade with respect to the cutting portion thereof whereby in one position the blade will be in alignment with the handle and in the reverse position the blade will be at a substantial angle with respect to the alignment of the handle.

The objects of the present invention are:—

First, to make a handle and a complementary insertable blade therefor which may be rigidly locked together at option in either of two alignments with respect to each other;

Second, to make a handle having a jaw portion positioned to accomplish such a result; and Third, to make a blade complementary to the handle whereby such result will be accomplished.

The means by which the foregoing and other objects are accomplished and the manner of their accomplishment will readily be understood from the following specification on reference to the accompanying drawing, in which:

Fig. 1 is a side elevation of the improved handle with the blade inserted therein and in substantial alignment therewith;

Fig. 2 is a similar side elevation with a portion of the jaws cut away showing the blade in reversed position secured in the handle;

Fig. 3 is a side elevation of the handle opened to receive or discharge the blade;

Fig. 4 is a side elevation of the blade itself;

Fig. 5 is an edge view of the handle and blade; and

Figs. 6 and 7 transverse sections approximately double scale, taken as on the lines VI—VI of Fig. 1, showing cross section of the jaws.

Referring now to the drawing in which the various parts are indicated by numerals, the handle comprises two substantially identical elongated flat parts 10 and 11 pivotally secured together as by a rivet 12. The handle parts extend forwardly beyond the rivet and are provided respectively with blade engaging jaws 13, 14 which are formed by turning inwardly one edge of each jaw part, thus forming blade engaging jaws which are substantially L shaped in cross section, and which are positioned so that the shouldered edges thus formed are oppositely disposed and adapted to engage opposite edges of a blade.

It will be understood that if it be so desired the jaws may be J shaped in transverse section as shown in Fig. 7.

The handle part 11 is provided with a shoulder 15, the depth of which may be the full thickness of the blade or half the thickness of the blade. In the former case the handle member 10 is not shouldered but in the latter case it is provided with a shoulder 16 similar to that on the handle 11. At the opposite end of the handle parts each is preferably halved to form complementary locking lugs 17, 18 the outer ends of which lugs are bent inwardly so that when forced past each other, these ends snap into place to hold the handles closed.

The edge of one of the jaws as the edge 19 of the jaw 13, preferably extends in substantial alignment with the handle whereas the edge 20 of the complementary jaw 14 converges inward toward the other end of the jaw.

21 is the blade which is usually of thin steel and is ordinarily sharpened on one edge 22 only. This blade is provided with a shank 23 which is complementary in shape to the socket formed for it by the blade jaws. One edge 24 of this shank preferably is a straight continuation of one edge of the blade proper, whereas the opposite edge 25 diverges outward toward the end of the shank along a line complementary to that of a jaw edge 20. To reduce the width of the shank, the blade may be notched at the junction 26 of the blade and shank. Preferably one-half of the end edge of the shank is at right angles to the edge 24 and the remaining half of such end is at right angles to the shank edge 25.

When assembled in the handle with the shank edge 24 against the jaw edge 19, the blade 21 will be firmly held in alignment with the handle as shown in Fig. 1, this position being that ordinarily used. When assembled with the shank edge 24 against the jaw edge 20 the blade 21 will be held at a substantial angle with respect to the handle alignment being thus positioned for certain special uses of value in surgical and other work.

The extent of the angularity effected is governed by the angularity of the jaw edge 20 and the corresponding angularity of the shank edge 25.

To engage the blade, the handle parts are swung apart, the blade is turned for straight or angular alignment as desired and inserted between the jaws, which are then closed and locked by engagement of the clamping lugs 17, 18. When so clamped the blade is held between the shoulders of the jaws with the end of the blade abutting firmly against the halved shoulders 15, 16. To release the blade it is only necessary to slightly twist the lugs 17, 18 to disengage them, and thereafter to swing the handle parts open allowing the blade to drop out of the jaws.

Having described our invention, what we claim is:

1. In a knife, a pair of handle members and a complementary detachable blade, said handle members being pivotally secured together, and each having an integral jaw-portion extending beyond said pivotal connection, said jaw portions being superposed and the facing surface of at least one jaw being cut away to receive said blade therebetween and form a shoulder for the shank end thereof, said jaws having each an inwardly turned edge, the proximate faces of said edges engaging the edges of said blade, one of said edges being in substantial alignment with said handle and the opposite of said edges converging inward toward the outer end of said jaw.

2. In a knife, a pair of handle members and a complementary detachable blade, said handle members being pivotally secured together, and each having an integral jaw portion extending beyond said pivotal connection, said jaw portions being superposed and cut away on their facing surfaces to receive said blade and form a shoulder for the end of the shank thereof, said jaws having each an inwardly extending edge portion, said edge portions facing each other and converging toward their ends, one of said edge portions being in substantial alignment with said handle.

3. In a knife, a pair of handle members and a complementary detachable blade, said handle members being pivotally secured together, and each having an integral jaw-portion extending beyond said pivotal connection, said jaw portions being superposed and the facing surface of at least one jaw being cut away to receive said blade therebetween and form a shoulder for the shank end thereof, said jaws having each an inwardly extending edge, the proximate faces of said edges engaging the edges of said blade, said edges converging from alignment with said handle, and the angle of one of said edges with said handle alignment being substantially greater than that of the other thereof.

4. A knife blade having a symmetrical shank portion reduced in width adjacent its junction with the blade and enlarging therefrom along diverging lines, one of said lines forming substantially a continuation of an edge of said blade, and the longitudinal center line of said shank being disposed at an angle to the longitudinal axis of said blade, whereby said blade is reversible to vary the angle of its cutting edge relative to the handle.

5. A knife blade of thin metal notched to define a shank portion, the side edges of said shank portion diverging symmetrically along straight lines toward the end of said shank, one of said edges forming substantially a continuation of an edge of said blade, and the longitudinal center line of said shank being disposed at an angle to the longitudinal axis of said blade, whereby said blade is reversible to vary the angle of its cutting edge relative to the handle.

6. A knife blade having an integral shank portion, said shank portion enlarging symmetrically rearward along diverging lines, one of said lines being at a substantially greater angle with the blade alignment than the other thereof, whereby the longitudinal center line of said shank is disposed at an angle to the longitudinal axis of said blade, and said blade is reversible to vary the angle of its cutting edge relative to the handle.

7. A knife blade having an integral shank portion, said shank portion widening symmetrically rearward along straight diverging lines, one of said lines being substantially a continuation of an edge of said blade, said shank having the two halves of its end edge respectively at right angles to the adjacent side edges of said shank, and the longitudinal center line of said shank being disposed at an angle to the longitudinal axis of said blade, whereby said blade is reversible to vary the angle of its cutting edge relative to the handle.

8. A knife blade having an integral shank portion, said shank portion widening symmetrically rearward along straight diverging lines, one of said lines being at a substantially greater angle with the blade alignment than the other thereof, said shank having the two halves of its end edge respectively at right angles to the adjacent side edges of said shank, and the longitudinal center line of said shank being disposed at an angle to the longitudinal axis of said blade, whereby said blade is reversible to vary the angle of its cutting edge relative to the handle.

DAVID S. GARDNER.
JOSEPH A. GARDNER.